March 19, 1963 F. E. SAUL 3,081,567
LAND LEVELING IMPLEMENT
Filed Dec. 22, 1961 4 Sheets-Sheet 1
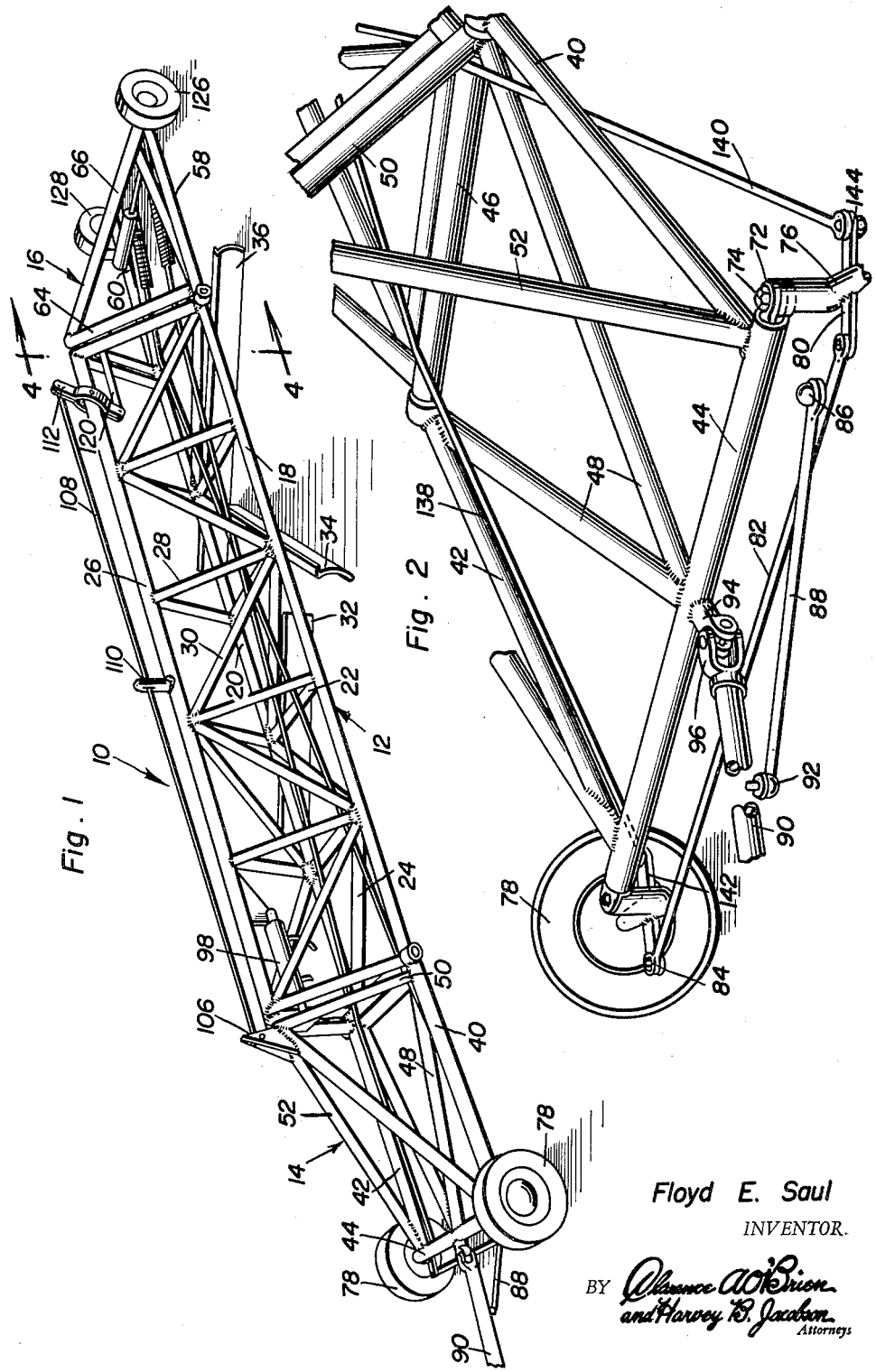
Floyd E. Saul
INVENTOR.

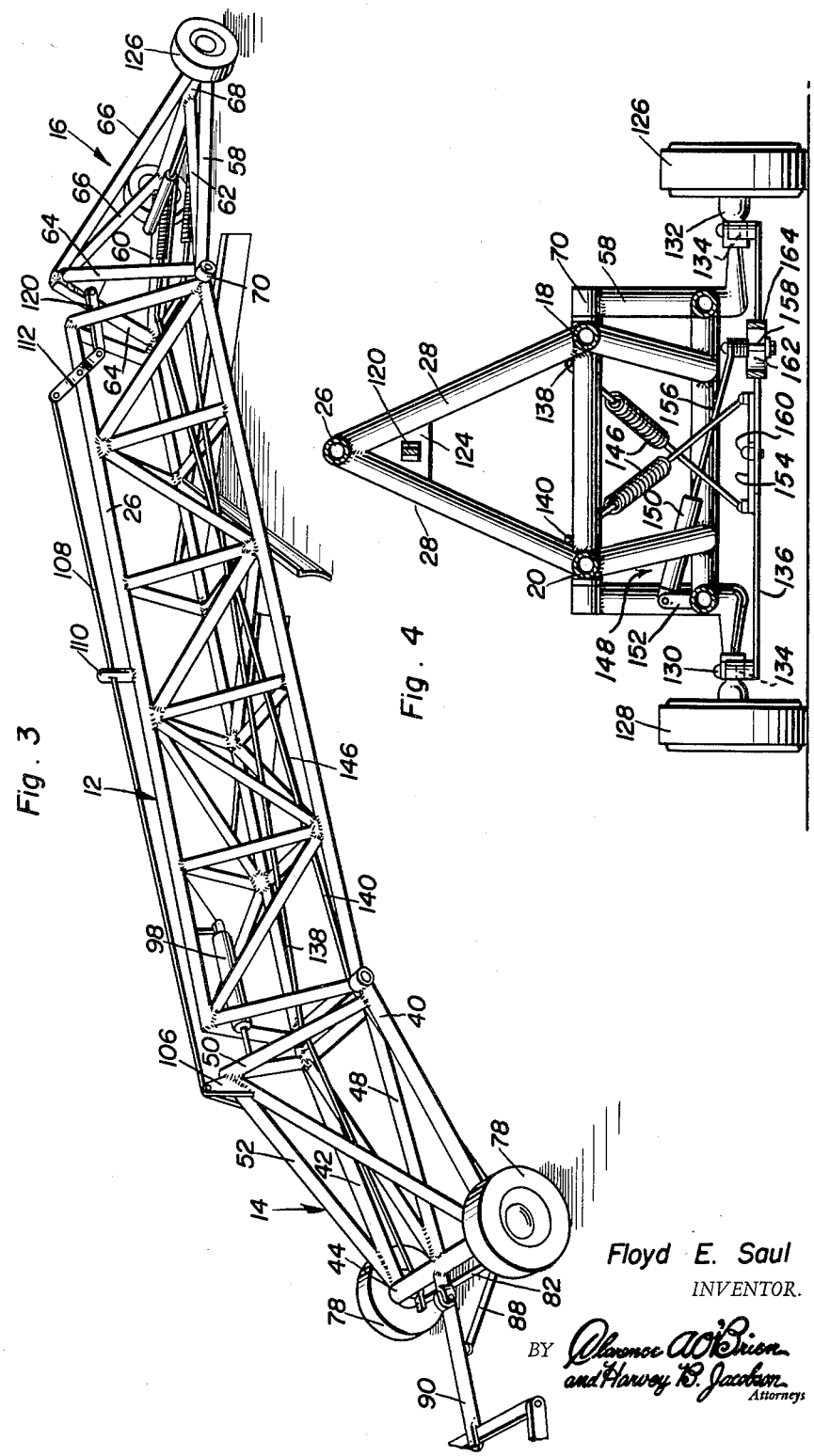

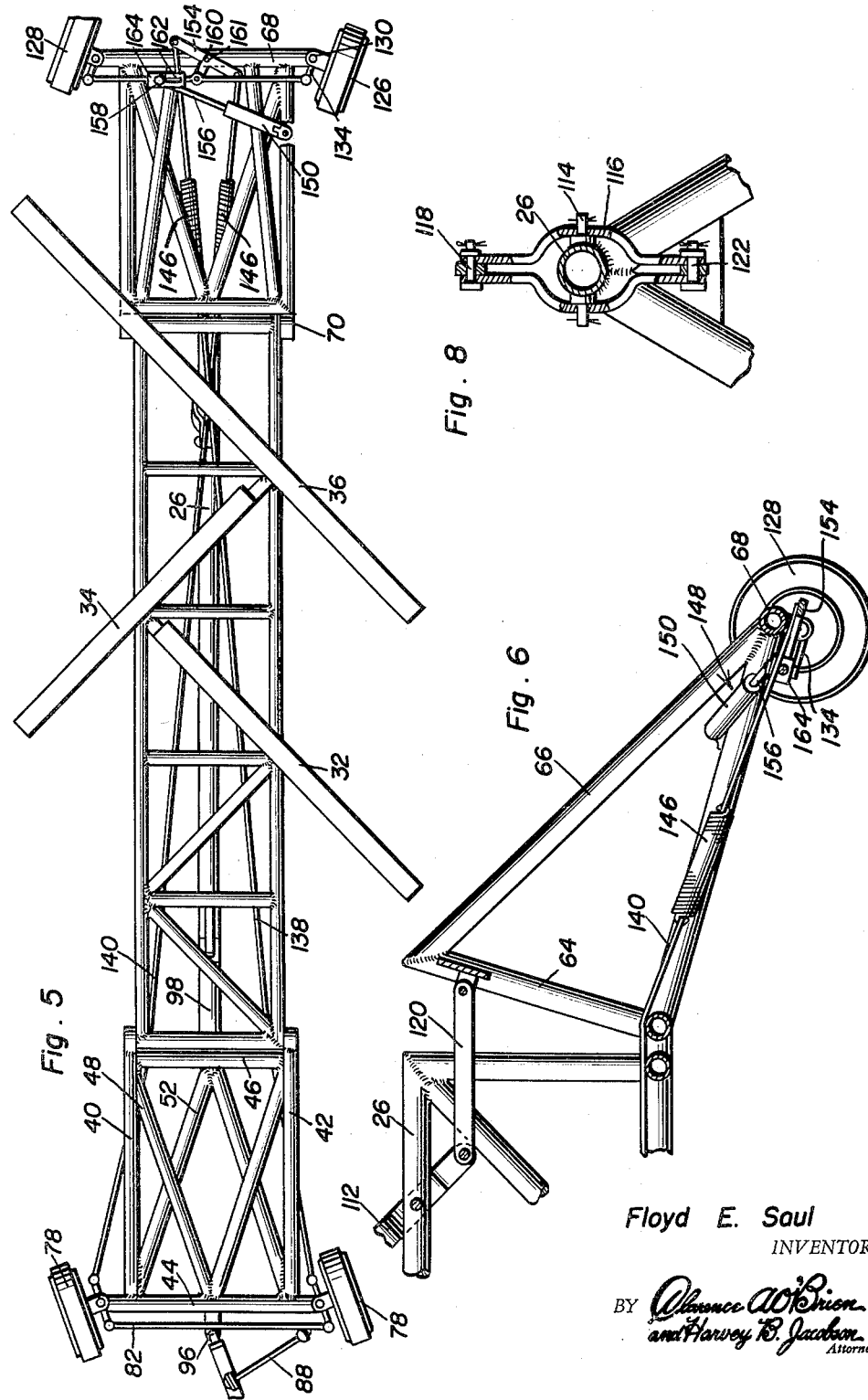

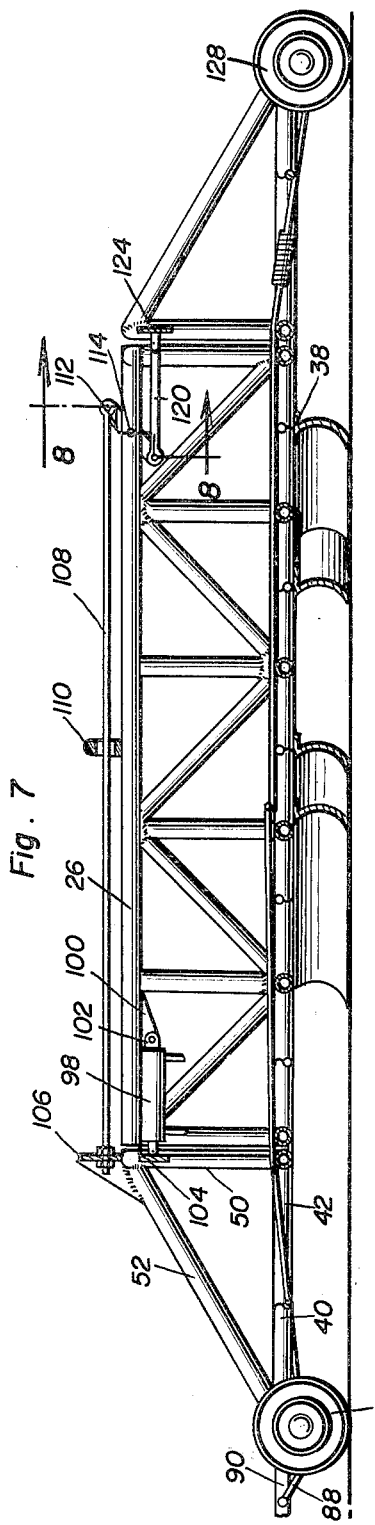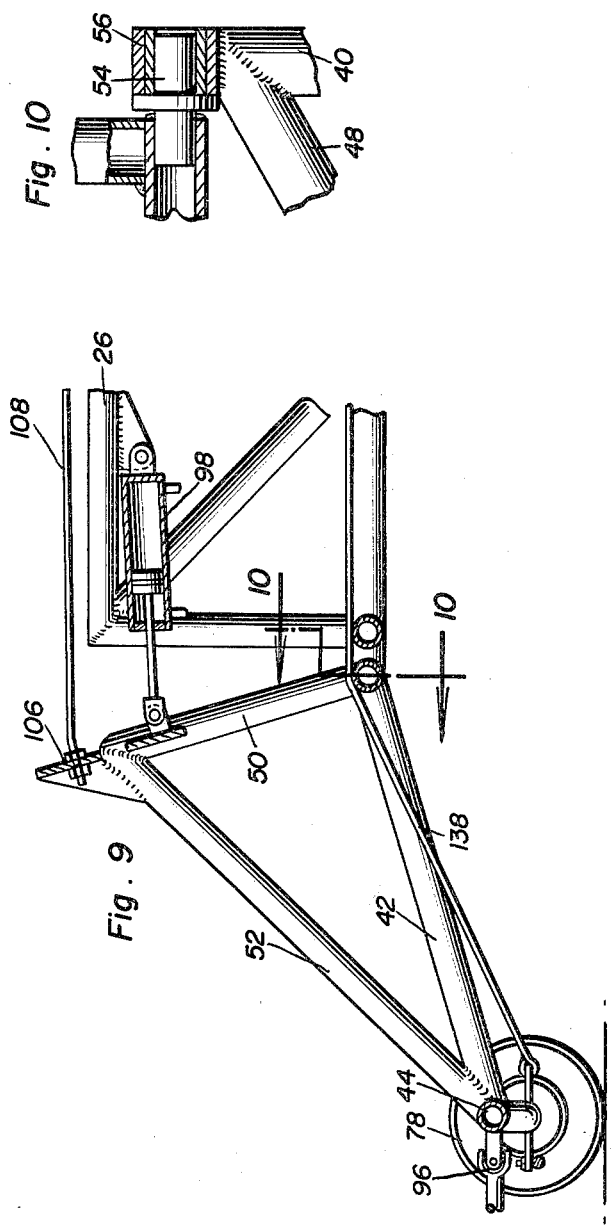
Floyd E. Saul
INVENTOR.

United States Patent Office 3,081,567
Patented Mar. 19, 1963

3,081,567
LAND LEVELING IMPLEMENT
Floyd E. Saul, 1320 S. Brukle, Stuttgart, Ark.
Filed Dec. 22, 1961, Ser. No. 161,515
12 Claims. (Cl. 37—152)

The present invention relates to a land leveler useful primarily for the purpose of leveling the surface of a cultivatable field such as is used in surface irrigation of certain crops.

In certain localities, the surface of a cultivatable field is leveled or planed prior to planting of a crop. This facilitates the planting, irrigation and harvesting of the crop and in order to properly irrigate the crop, it is necessary that the surface of the land be substantially level. Various implements have been heretofore provided for this purpose and such implements have been successful to a certain degree. However, in order to properly level the surface, the length of the leveler is quite long as compared to its width thereby introducing deflection in the frame of a sufficient scope to introduce inaccuracy into the surface being levelled. Also, there is no successful means for raising and lowering the leveling blades nor is there a adequate means for enabling maneuverability of the lever.

Therefore, it is the primary object of the present invention to provide a land leveler having a novel frame structure in the form of a triangular truss arrangement to introduce longitudinal and lateral rigidity to the frame to prevent deflection thereof.

Still another object of the present invention is to provide a land leveler constructed into three segments with each end segment having supporting wheels and pivotal connection with the central section and the central section having the leveling blades mounted thereon and means interconnecting the central section and the two end sections for simultaneous pivotal movement of the end sections in relation to the central section thereby elevating and lowering the central section which permits the leveling blades to be rigidly affixed to the central section but yet movable in a vertical direction parallel to the surface to be leveled.

Yet another important feature of the present invention is to provide a land leveler having a four wheel steering assembly actuated by virtue of the pivotal movement of the drawbar as it is pulled by a tractor or the like whereby a suitable linkage is connected between the front wheels and the rear wheels to automatically turn the rear wheels in a direction opposite to the front wheels so that the land leveler will more easily negotiate a turn.

Yet another important object of the present invention is to provide a land leveler which is simple in construction, easy to use, efficient in operation, long lasting, rigid, dependable, easy to repair and maintain and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

FIGURE 1 is a perspective view of the land leveler of the present invention;

FIGURE 2 is a partial perspective view of the leveler illustrating the construction of the front wheel steering mechanism and the connection with the linkage for steering the rear wheel;

FIGURE 3 is a perspective view of the land leveler with the central section in elevated position;

FIGURE 4 is a transverse, sectional view taken substantially upon a plane passing along section line 4—4 of FIGURE 1 illustrating the mechanism for pivoting the rear wheels beyond the position normally acquired by virture of the rear wheels being connected with the front wheels;

FIGURE 5 is a bottom plan view of the land leveler;

FIGURE 6 is a detailed sectional view illustrating the structure of the rear wheel dolly or assembly;

FIGURE 7 is a longitudinal sectional view of the land leveler;

FIGURE 8 is a detailed sectional view taken substantially upon a plane passing along section line 8—8 of FIGURE 7 illustrating the mechanism for causing simultaneous movement of the end sections;

FIGURE 9 is a detailed sectional view of the front wheel dolly; and

FIGURE 10 is a detailed sectional view taken substantially upon a plane passing along section line 10—10 of FIGURE 9 illustrating the pivotal connection between the end sections and the center section.

Referring now specifically to the drawings, the numeral 10 generally designates the land leveling implement of the present invention which includes a center section generally designated by the numeral 12 and a forward section generally designated by the numeral 14 and a rear section generally designated by the numeral 16.

The center section 12 includes a pair of bottom frame rails 18 and 20 rigidly interconnected by a plurality of transverse brace members 22 and diagonal brace members 24. Disposed above the frame rails 18 and 20 and centrally located thereinbetween is a top frame rail 26 rigidly supported from the bottom frame rails 18 and 20 by vertically disposed and inwardly inclined braces 28 and vertically disposed diagonal braces 30. The frame rails 18, 20 and 26 form apices of a triangular frame in which the cross-sectional configuration is specifically illustrated in FIGURE 4. This configuration of the frame forms a triangular truss and provides extreme rigidity to resist deflection both vertically and horizontally and also to resist deflections about a longitudinal axis. This frame is especially rigid in view of the length of the center section and the necessity of maintaining the frame rigid at all times since the center section 12 also supports grader blades 32, 34 and 36 rigid thereunder by virtue of a top horizontal flange 38 being rigidly connected to the bottom frame rails or to the bracing 22 and 24 by suitable means such as welding or the like. The grader blades 32, 34 and 36 are inclined with respect to each other so that the soil will be moved in a zig-zag manner, that is the first blades 32 will move excess soil forwardly and to the left when viewed from the rear while the soil which is discharged from the trailing end of the blade 32 will be picked up by the front of the blade 34 and moved forwardly and to the right and the soil discharged from the blade 34 will be picked up and moved to the left by the blade 36 and the trailing end of the blade 36 extends outwardly beyond the rear wheels of the leveler to assure that the wheels will be travelling on level ground. All of the bracing and frame rails are preferably constructed of tubular metal pipe with the various components being secured together by welding thus providing a rigid integral unit with only the grader blades having a replaceable blade edge if desired.

The front section 14 includes a pair of bottom rails 40 and 42 interconnected at the forward end thereof by a front rail 44 and interconnected at their end by a rear rail 46. Diagonal brace rails 48 interconnect the front rail 44 at the center thereof with the outer ends of the rear rail 46. Extending upwardly from the ends of the rear rail 46 is a pair of upwardly and inwardly inclined rails 50 and extending upwardly and rearwardly from the outer ends of the front rail 44 is a pair of inclined diagonal rails or braces 52 thus forming a triangular framework having a triangular cross-sectional configuration defined by the bottom rail 46 and the braces 50 at the rear thereof and tapering forwardly to a transverse front rail 44.

The rear end of the front section 14 is pivotally connected to the forward ends of the bottom rails 18 and 20 of the center section 12 by virtue of a pivot pin or shaft 54 extending outwardly from a front transverse rail 22 of the center section 18 and being received in a bearing 56 rigid with the rear end of the bottom rails 40 and 42 respectively thereby pivoting the front section for articulate movement about a transverse horizontal axis.

The rear section 16 is of substantially the same construction in that it is provided with bottom rails 58 and 60, inclined braces 62, vertically inclined rails or braces 64 and downwardly and rearwardly inclined diagonal braces 66. The rear ends of the rails 58 and 60, the braces 62 and the braces 66 rigidly connect with a transverse rear frame rail 68 and the same type of articulate connection 70 is employed between the center section 12 and the rear section 16 as between the center section 12 and the front section 14.

Each end of the front frame rail 44 on the front section 14 is provided with a bracket 72 receiving a vertical bolt or kingpin 74 which pivotally supports a front axle or spindle 76 each of which carries a steerable front wheel 78 whereby movement of the wheel 78 may be accomplished by pivoting the supporting spindle 76 about the vertical axis of the kingpin or bolt 74. Each spindle 76 is provided with an offset arm 80 and the arms on the two spindles are interconnected by a tie rod 82 with a pivot connection 84 securing the ends of the tie rod 82 to the arms 80.

Connected to the tie rod 82 by suitable ball and socket connection 86 is a drag link 88 having the other end thereof connected to a forwardly extending tongue 90 by virtue of a ball and socket connection 92. The rear end of the tongue 90 is secured to a forwardly projecting member 94 on the transverse rail 44 by virtue of the universal joint 96 which connects the tongue 90 to the frame rail 44 for universal adjustment whereby the tongue 90 may move in a vertical or horizontal plane or in any angular direction. The forward end of the tongue 90 is provided with means for attachment to a tractor drawbar (not shown). Thus, as the tractor maneuvers around a curve, the tongue 90 will be pivoted about generally a vertical axis thus moving the drag link 88 and tie rod 82 thereby simultaneously pivoting the front wheels 78 about the vertical axes formed by the kingpins or bolts 74. The universal joints 86 and 92 enable variations in the vertical postion of the tongue 90 while still maintaining the operative connection between the tongue and the tie rod.

The tractor (not shown) is provided with the usual and conventional hydraulic pressure system which pressure is employed for changing the elevational position of the center section in relation to the end sections 14 and 16 by changing the angular orientation of the end sections 14 and 16 in relation to the center section 12. The movement of both the front and rear of the center section in a vertical direction is simultaneous thereby maintaining the grader blades 32, 34 and 36 in parallel relation to the ground surface. For pivoting the end section 14 in relation to the center section 12, there is provided a hydraulically operated piston and cylinder assembly 98 in which one end of the cylinder is pivotally attached to a bracket 100 carried by the top rail 26 by virtue of the pivot pin 102. The end of the piston is connected with a vertical plate 104 rigid with the braces 50 at the top or apex thereof. Thus, as the piston and cylinder 98 is expanded, the plate 104 will be forced away from the center section 12 thereby forcing the top end of the front section 14 away from the center section to a position illustrated in FIGURE 3 thereby causing the forward end of the center section to elevate.

In order to interconnect the rear section for causing it to elevate the rear end of the center section simultaneously with the front end of the center section, there is provided an upstanding bracket 106 at the top or apex of the front section having a tension rod of cable 108 connected thereto. The rod or cable 108 runs through a guide 110 on the top rail 26 and the rear end thereof is connected to one end of a fulcrum bar or lever 112 having the center thereof pivoted to the top rail 26 by virtue of pivot pins 114 rigidly connected to the top rail 26 and extending outwardly through the center section of the bar 112 which actually is in the form of a pair of separate bars or levers having the center portion 116 bowed outwardly as illustrated in FIGURE 8. The rear end of the rod or cable 108 is connected to the upper end of the pivot bar or lever 112 by a pivot bolt 118 and the bottom end of the bar or lever 112 is pivotally connected to a short rod or operating link 120 by virtue of a pivot bolt 122. The rear end of the operating link 120 is engaged with a transverse plate 124 carried by the upwardly inclined brace member 64 in substantially the same position as the plate 104. Thus, as the top end of the front section moves forwardly, the bracket 106 moves forwardly thus moving the rod or cable 108 in a linear manner for pivoting the fulcrum bar or lever 112. Thus, the motion is transmitted to the top end of the rear section thus moving it rearwardly simultaneously with forward movement of the top end of the front section thus raising and lowering the front and rear ends of the center section 12 in a simultaneous manner. If desired, the type of linkage inter-connection between the three sections may vary and various adjustments may be provided for assuring that the center section will be maintained level with the ground surface at all times and any movement thereof will be carried out simultaneously in both the front and rear ends thereof.

Provision is made for steerably supporting the rear end of the rear section 16 by virtue of rear steerable wheels 126 and 128 which are supported on kingpins or vertical bolts 130 similar to the arrangement at the front end of the front section. The kingpin assembly 130 supports spindles 132 each of which has an offset arm 134 interconnected by a tie rod or bar 136. For pivoting the arm 134, there is provided a pair of cables 138 and 140 which extend longitudinally of the center section and which are crossed in relation to each other as illustrated in FIGURES 1 and 3. The forward ends of the cables 138 and 140 are connected to offset arms 142 and 144 respectively thereby providing for simultaneous movement of the rear steerable wheels 126 and 128 in opposite direction to the front steerable wheels 78. In each of the cables 138 and 140 is a tension spring 146 which enables elongation of the cables 138 and 140 sufficient to enable elevational change of the center section 12 without breaking the cables 138 and 140. Thus, with this arrangement, the rear steerable wheels 126 and 128 will pivot in an opposite direction to the front wheels 78 through an equal angle thus facilitating the turning of the leveling implement which is quite long and rather difficult to turn around at the end of an enclosure such as the field being leveled.

There is also provided means for turning the rear steerable wheels 126 and 128 to a greater angular degree than are the front steerable wheels 78. Such means includes a hydraulic piston and cylinder assembly 148 including a cylinder 150 pivotally connected to a bracket 152 carried by the rear section frame. The piston has a piston rod 156 connected to a vertical pin 158 by virtue of a ball and socket connection. The pin 158 extends vertically through a slot 162 in a plate 164 rigidly attached to the transverse tie rod 136 interconnecting the steering arms 134. The tie rod 136 also is pivotally connected to a T-shaped member 154 by pin 160. Member 154 is pivoted to rail 68 by pin 161 and the ends of the arms thereof are connected to cables 138 and 140. Thus, during normal movement of the tie rod 136 due to pivoting of the rear wheels in response to pivoting of the front wheels, the pin 158 will merely ride in the slot 162.

However, when it is desired to pivot the rear steerable wheels 126 and 128 to a greater angular degree than the front steerable wheels 78 have been pivoted, then it is only necessary to expand or retract the piston and cylinder 148 thus moving the tie rod 136 to a greater degree. This will act as an override to the automatic steering mechanism and the springs will enable this override to be accomplished without destruction of the cables 138 and 140. Further, in the event one of the cables becomes inoperative, steering control for the rear wheels may be had by operating the piston and cylinder assembly which is connected with the hydraulic pressure system of the towing tractor (not shown) and the operator of the tractor, of course, will have control valves for selectively controlling the admission of fluid pressure into either end of the piston and cylinder assembly 148 and also into the piston and cylinder assembly 98 for raising and lowering the center section.

Thus, the present invention has several important features which are novel and produce desirable and advantageous results. The triangular truss frame is extremely important for rigidity in all directions especially in view of the elongated nature of the implement. Elevation of the blades is such that parallelism is maintained and such elevation of the center section will provide considerable ground clearance for transport which is extremely important in view of the length of the machine especially when traversing uneven terrain during transport. The blades are rigidly mounted thus greatly simplifying the structure and are raised or lowered as the center section is raised or lowered. The geometry of the connections and mechanical device to simultaneously move both ends of the center section will cause the hinged end sections to move equally and maintain the blades in a level plane.

In normal operation, the implement uses four wheel steering activated through movement of the drawbar or tongue by the pulling tractor which is connected to the front wheels by a linkage and by crossed cables to the rear wheels and the rear wheels have an overriding power steering arrangement for further increasing the maneuverability of the implement which has been one of the major objections to such implements in view of the length thereof. The steerable rear wheels and the hydraulic powered assembly connected thereto also greatly facilitates the backing up of the machine since the rear wheels can be pivoted in either direction from the tractor by remote controls thus enabling the machine to be quite readily maneuvered to more expeditiously level an enclosed field or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A land leveling implement comprising a mobile frame having a center section, a front section and a rear section, steerable wheel means mounted on the front section, steerable wheel means mounted on the rear section, a pivotal connection interconnecting the front section and the center section, a pivotal connection interconnecting the rear section and the center section, each of said pivotal connections enabling relative pivotal movement about a transverse axis, means interconnecting said sections for simultaneously swinging the end sections about their pivotal connections with the center section for raising and lowering the center section while maintaining the center section parallel to the ground surface, and greater blade means mounted on said center section for movement therewith.

2. A land leveling implement comprising a mobile frame having a center section, a front section and a rear section, wheel means mounted on the front section, wheel means mounted on the rear section, a pivotal connection interconnecting the front section and the center section, a pivotal connection interconnecting the rear section and the center section, each of said pivotal connections enabling relative pivotal movement about a transverse axis, means interconnecting said sections for simultaneously swinging the end sections about their pivotal connections with the center section for raising and lowering the center section while maintaining the center section parallel to the ground surface, and grader blade means mounted on said center section for movement therewith, said center section including spaced horizontal longitudinal frame rails at the bottom edges thereof, a top frame rail spaced above and centrally disposed between the longitudinal rails, and bracing rigidly interconnecting said rails thereby forming a triangular truss frame having rigidity and resistance to deflection in all directions.

3. A land leveling implement comprising a mobile frame having a center section, a front section and a rear section, wheel means mounted on the front section, wheel means mounted on the rear section, a pivotal connection interconnecting the front section and the center section, a pivotal connection interconnecting the rear section and the center section, each of said pivotal connections enabling relative pivotal movement about a transverse axis, means interconnecting said sections for simultaneously swinging the end sections about their pivotal connections with the center section for raising and lowering the center section while maintaining the center section parallel to the ground surface, and grader blade means mounted on said center section for movement therewith, said wheel means on the front section including two steerable wheels, a forwardly extending tongue attached to the front section for universal swinging movement in relation thereto, and linkage means interconnecting the tongue and the front steerable wheels for pivoting the front steerable wheels in response to swinging movement of the tongue in a lateral direction.

4. The structure as defined in claim 3 wherein said wheel means on the rear section includes a pair of rear steerable wheels, and means interconnecting the rear steerable wheels and the front steerable wheels for pivoting the rear steerable wheels in an opposite angular direction to the front steerable wheels thereby facilitating the maneuvering of the implement.

5. The structure as defined in claim 4 wherein said means interconnecting the rear steerable and the front steerable wheels includes crossed cables, means connecting the rear ends of said cables with the rear steerable wheels, each cable having a spring insert therein to enable limited elongation thereof for accommodating changes in relative elevation between the center section and the end sections.

6. The structure as defined in claim 5 wherein said connecting means between the rear ends of the cables and the rear steerable wheels includes a T-shaped member having the ends of the cross arm thereof pivotally connected to the rear section and the ends connected to the cables, offset arms connected with the rear wheels, a tie rod connected between said arms, the shank of said T-shaped member being pivotally connected to the tie rod for pivoting the rear wheels in response to linear movement of said cables, and fluid pressure operated means connected to the tie rod for swinging the rear wheels beyond the degree of movement imparted by said cables.

7. A land leveling implement comprising a mobile frame having a center section, a front section and a rear section, wheel means mounted on the front section, wheel means mounted on the rear section, a pivotal connection interconnecting the front section and the center section, a pivotal connection interconnecting the rear section and the center section, each of said pivotal connections enabling relative pivotal movement about a transverse axis, means interconnecting said sections for simultaneously swinging the end sections about their pivotal connections with the center section for raising and lowering the center section while maintaining the center section parallel to the ground surface, and grader blade means mounted on said center section for movement therewith, said front section and rear section having a triangular portion disposed adjacent the ends of the center section, said means interconnecting the sections for enabling simultaneous movement of the front and rear ends of the center section including a piston and cylinder assembly interconnecting the center section and the front section adjacent the upper end thereof and spaced from the transverse axis whereby expansion and contraction of the piston and cylinder arrangement will cause pivotal movement of the front section in relation to the center section about the transverse axis forming the pivotal connection, an elongated member interconnecting the front section and a fulcrum member pivotally attached to the front section adjacent the rear thereof, said pivotal member being supported at the center, and a bar interconnecting the other end of the pivotal member and the upper end portion of the rear section for swinging the rear section in relation to the center section simultaneously and equally to the movement between the front section and the center section.

8. The structure as defined in claim 7 wherein said grader blade means includes at least three blades arranged in angular relation with the blades being partially overlapped thereby moving the soil in a zig-zag manner as the machine passes thereover thereby leveling the soil, the rearmost blade having a trailing edge disposed slightly outwardly from the implement thereby assuring that the implement travels on a level graded surface.

9. A land leveling implement comprising a mobile frame having a center section, a front section and a rear section, wheel means mounted on the front section, wheel means mounted on the rear section, a pivotal connection interconnecting the front section and the center section, a pivotal connection interconnecting the rear section and the center section, each of said pivotal connections enabling relative pivotal movement about a transverse axis, means interconnecting said sections for simultaneously swinging the end sections about their pivotal connections with the center section for raising and lowering the center section while maintaining the center section parallel to the ground surface, and grader blade means mounted on said center section for movement therewith, the wheel means on each end section being in the form of steerable wheel means, the front steerable wheel means being connected to a tongue, and means interconnecting the rear steerable wheels with the front steerable wheels for pivoting the rear steerable wheels in an opposite angular direction compared with the front steerable wheels, and means overriding the interconnection between the front steerable wheels and the rear steerable wheels for enabling the rear steerable wheels to pivot to a greater angular degree or in any desired angular degree for steering the implement.

10. A land leveling implement comprising a mobile frame having a center section, a front section, and a rear section, a pivotal connection interconnecting the front section and the center section, a pivotal connection interconnecting the rear section and the center section, each of said pivotal connections enabling relative pivotal movement about a transverse axis, means interconnecting said sections for simultaneously swinging the end sections about their pivotal connections with the center section for raising and lowering the center section while maintaining the center section parallel to the ground surface, and grader blade means mounted on said center section for movement therewith, said center section including spaced horizontal longitudinal frame rails at the bottom edges thereof, a top frame rail spaced above and centrally disposed between the longitudinal rails, and bracing rigidly interconnecting said rails thereby forming a triangular truss frame having rigidity and resistance to deflection in all directions.

11. A land leveling implement comprising a mobile frame having a center section, a front section and a rear section, wheel means mounted on the front section, wheel means mounted on the rear section, a pivotal connection interconnecting the front section and the center section, a pivotal connection interconnecting the rear section and the center section, each of said pivotal connections enabling relative pivotal movement about a transverse axis, means for swinging the end sections about their pivotal connections with the center section for raising and lowering the center section, and grader blade means mounted on said center section for movement therewith, said center section including spaced horizontal longitudinal frame rails at the bottom edges thereof, a top frame rail spaced above and centrally disposed between the longitudinal rails, and bracing rigidly interconnecting said rails thereby forming a triangular truss frame having rigidity and resistance to deflection in all directions.

12. The structure as defined in claim 1 including means interconnecting the rear steerable and the front steerable wheels comprising crossed cables, means connecting the rear ends of said cables with the rear steerable wheels, each cable having a spring inserted therein to enable limited elongation thereof for accommodating changes in relative elevation between the center section and the end sections.

References Cited in the file of this patent
UNITED STATES PATENTS

| | | |
|---|---|---|
| 2,526,130 | Gurries et al. | Oct. 17, 1950 |
| 2,866,281 | Breaux | Dec. 30, 1958 |
| 2,994,143 | Kenney | Aug. 1, 1961 |